United States Patent
Bradley et al.

(10) Patent No.: US 6,907,994 B2
(45) Date of Patent: Jun. 21, 2005

(54) PROCESS FOR CONVERTING WET FLY ASH INTO DRY USEFUL INDUSTRIAL PRODUCTS

(75) Inventors: William S. Bradley, Catlettsburg, KY (US); Robert L. Carnahan, Huntington, WV (US); Frank A. Elk, Huntington, WV (US); Riley D. Robbins, Beckley, WV (US)

(73) Assignee: C.A.S.T. Minerals, Inc., Huntington, WV (US)

( * ) Notice: Subject to any disclaimer, the term of this patent is extended or adjusted under 35 U.S.C. 154(b) by 244 days.

(21) Appl. No.: 10/274,285

(22) Filed: Oct. 18, 2002

(65) Prior Publication Data

US 2003/0089642 A1 May 15, 2003

Related U.S. Application Data

(60) Provisional application No. 60/337,541, filed on Oct. 22, 2001.

(51) Int. Cl.$^7$ .............................. B09B 3/00; B07B 1/46
(52) U.S. Cl. ...................... 209/11; 209/238; 209/659; 106/405; 106/705; 106/DIG. 1
(58) Field of Search .......................................... 209/19

(56) References Cited

U.S. PATENT DOCUMENTS

| | | | | |
|---|---|---|---|---|
| 3,328,180 A | * | 6/1967 | Ban .............................. 501/81 |
| 3,680,501 A | * | 8/1972 | Szilagyi et al. .............. 110/212 |
| 4,218,832 A | * | 8/1980 | Daniels .......................... 34/79 |
| 4,328,037 A | * | 5/1982 | Demirel et al. .............. 106/705 |
| 4,516,510 A | * | 5/1985 | Basic, Sr. ..................... 110/346 |
| 4,961,843 A | | 10/1990 | Lewis |
| 5,160,539 A | | 11/1992 | Cochran |
| 5,390,611 A | * | 2/1995 | John ...................... 110/165 A |
| 5,555,821 A | * | 9/1996 | Martinez ..................... 110/191 |

* cited by examiner

*Primary Examiner*—Donald P. Walsh
*Assistant Examiner*—Jonathan R Miller
(74) *Attorney, Agent, or Firm*—Carter, Schnedler, & Monteith

(57) ABSTRACT

There is provided a process for converting wet fly ash into a useful product such as cement replacement or industrial filler. A first amount of wet fly ash is provided. The wet fly ash is fed into a mixing chamber. An amount of aggregate, such as stone, is provided. The aggregate is also fed into the mixing chamber where the wet fly ash is mixed with the aggregate. The mixed wet fly ash and aggregate is fed into a drying chamber where the mixture is heated, thereby drying the fly ash and heating the aggregate. The heated aggregate is separated from the fly ash. The heated aggregate is fed back into the mixing chamber. A second amount of wet fly ash is added to the mixing chamber where is it mixed with the heated aggregate. The heated aggregate assists in drying the second amount of wet fly ash. Once in cycle, the process is continuous. Preferably, after the dried fly ash is segregated from the heated aggregate, it is introduced to a burner where the carbon component is oxidized and the beneficated fly ash exits.

10 Claims, 4 Drawing Sheets

PROCESS FOR CONVERTING WET FLY ASH INTO DRY USEFUL INDUSTRIAL PRODUCTS

RELATION TO PRIOR APPLICATION

This is a U.S. non-provisional application relating to and claiming the benefit of U.S. Provisional Application Ser. No. 60/337,541 filed Oct. 22, 2001.

FIELD OF INVENTION

The present invention relates to the field of processing fly ash from coal fired facilities. More particularly, it relates to a process for converting wet fly ash into a useful product.

BACKGROUND OF THE INVENTION

Ash generated as a byproduct at a coal combustion power plant can be utilized as a useful product if properly sized, if certain mineral impurities are minimized, and if moisture content of the product is controlled. Historically, fly ash discharged on a dry basis from coal combustion power plants can be utilized based upon the ash having certain physical and chemical characteristics, but inefficiencies inherent in the pulverization and burning of coal to generate electricity often result in fly ash that is not in a suitable form for use as a cement replacement or industrial filler. U.S. Pat. No. 5,160,539, issued to Cochran, teaches a method of fly ash benefication by carbon burnout in a dry bubbling fluid bed. The Cochran patent, however, does not disclose benefication of wet fly ash. Ash deposited into ponds, often with coarser ash, limits the beneficial use options due to particle size, moisture and mineral impurities. U.S. patent application Ser. No. 09/698,757, filed on Oct. 27, 2000, assigned to CAST MINERALS, INC., assignee of the present invention, teaches a method for segregating ponded coal combustion materials, including fly ash. U.S. Pat. No. 4,961,843 teaches an apparatus for hydraulically classifying particles and may be used in conjunction with the teachings of application Ser. No. 09/698,757. The teachings of U.S. patent application Ser. No. 09/698,757 and U.S. Pat. No. 4,961,843 are hereby incorporated herein by reference.

OBJECTS OF THE INVENTION

It is therefore one object of this invention to provide an improved process for converting wet fly ash into a useful product.

It is another object to provide a process for converting wet fly ash into a useful product which saves energy.

SUMMARY OF THE INVENTION

In accordance with one form of this invention, there is provided a process for converting wet fly ash into a useful product. The first amount of wet fly ash is also introduced. An amount of aggregate, such as stone, is introduced. The aggregate and wet fly ash are mixed. The mixture of wet fly ash and aggregate is heated, thereby drying the fly ash and heating the aggregate. The dried fly ash is segregated from the heated aggregate. A second amount of wet fly ash is introduced and mixed with the previously heated aggregate so that the heated aggregate assists in drying the second amount of wet fly ash, thereby reducing the energy required to convert the wet fly ash into a useful product. Once in cycle, the process is continuous.

Preferably, after the dried fly ash is segregated from the heated aggregate, it is introduced to a burner where the carbon component is oxidized and the beneficated fly ash exits.

BRIEF DESCRIPTION OF THE DRAWINGS

The subject matter which is regarded as the invention is set forth in the appended claims. The invention itself, however, together with further objects and advantages thereof may be better understood in reference to the following description taken in conjunction with the accompanying drawings in which:

DESCRIPTION OF THE PREFERRED EMBODIMENT

Figure 1:
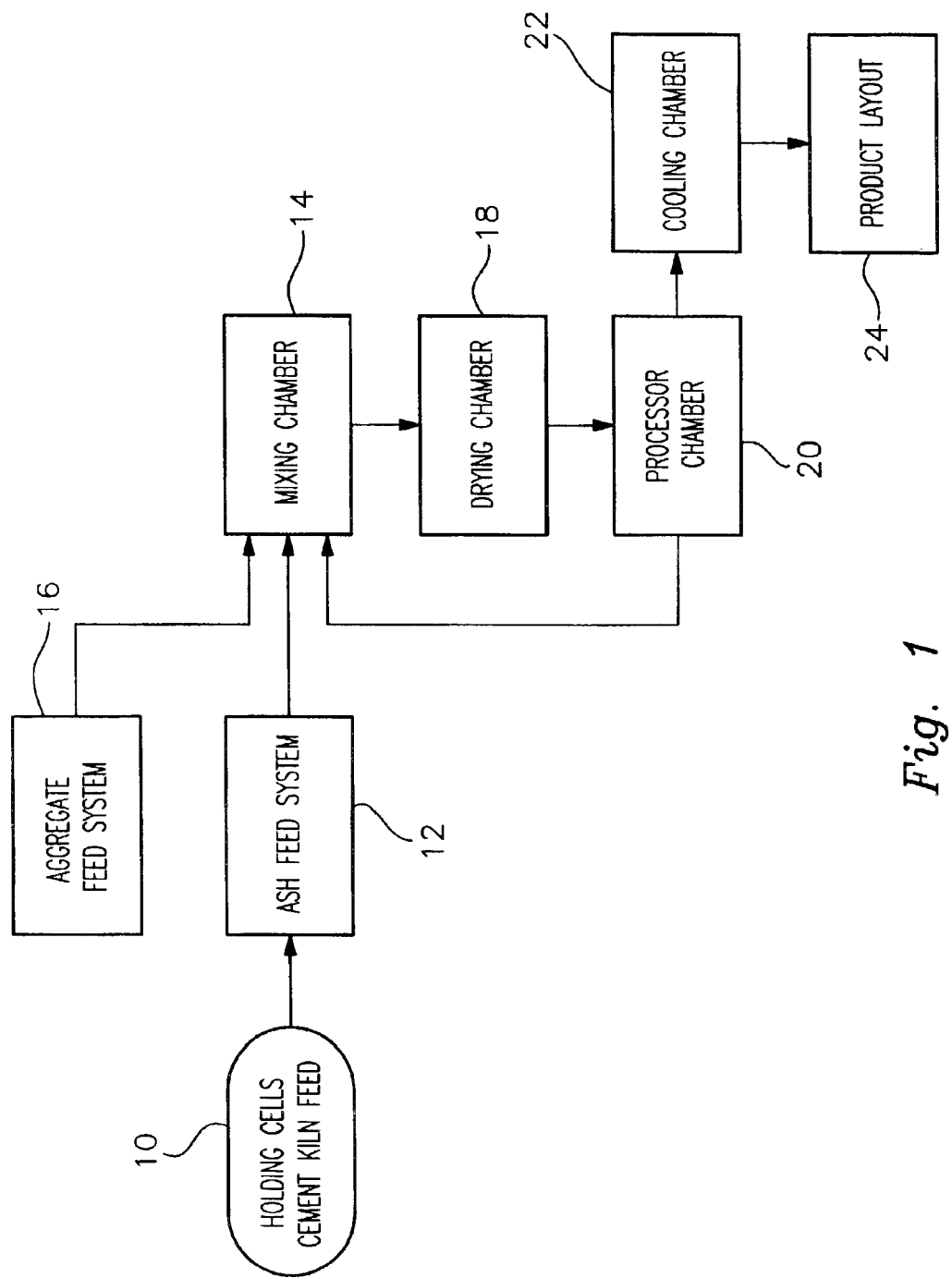
FIG. 1 is a block diagram showing a process utilizing one embodiment of the invention.
Figure 2:
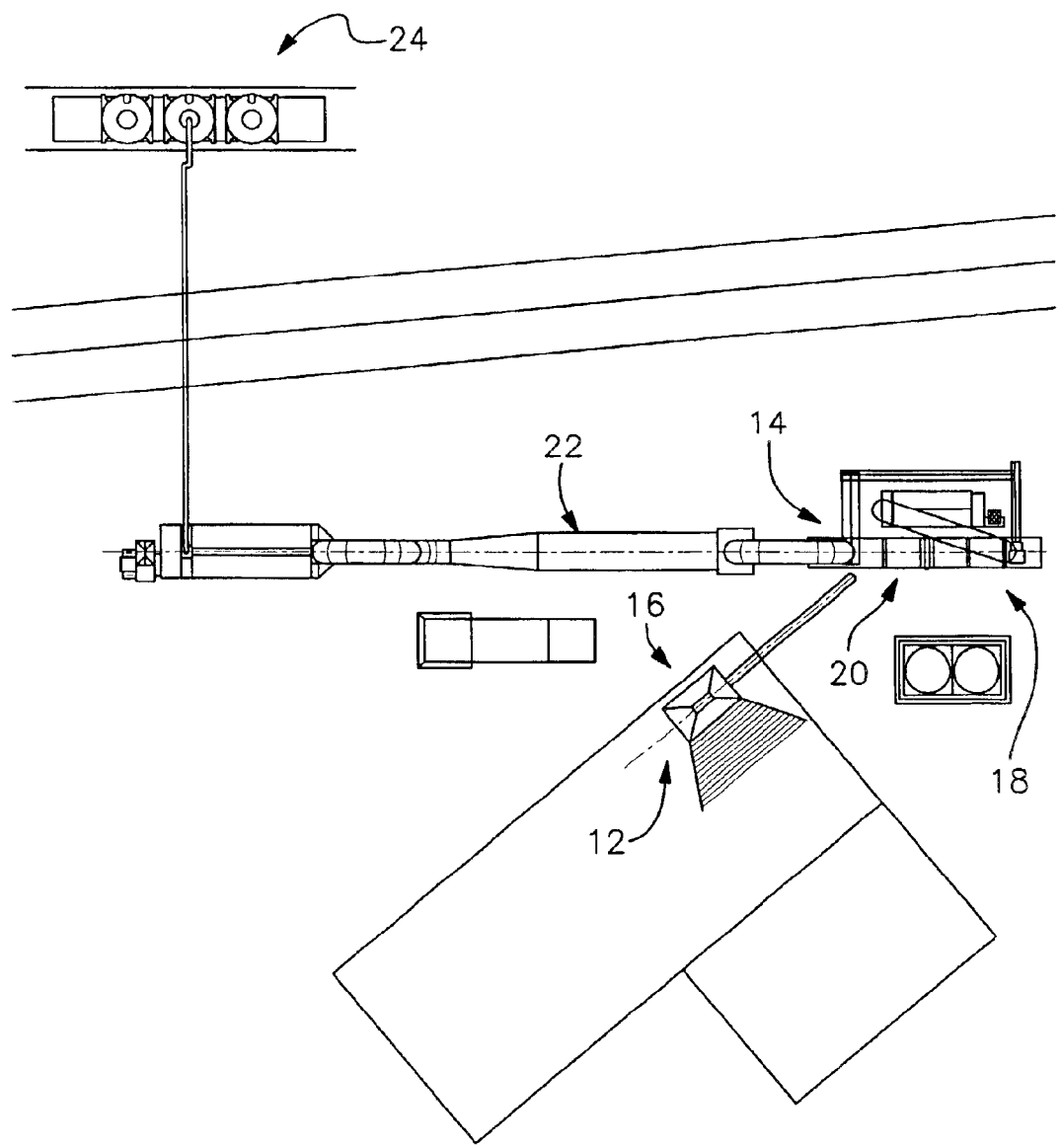
FIG. 2 is a top view of equipment which may be used to carry out the process of FIG. 1.
Figure 3:
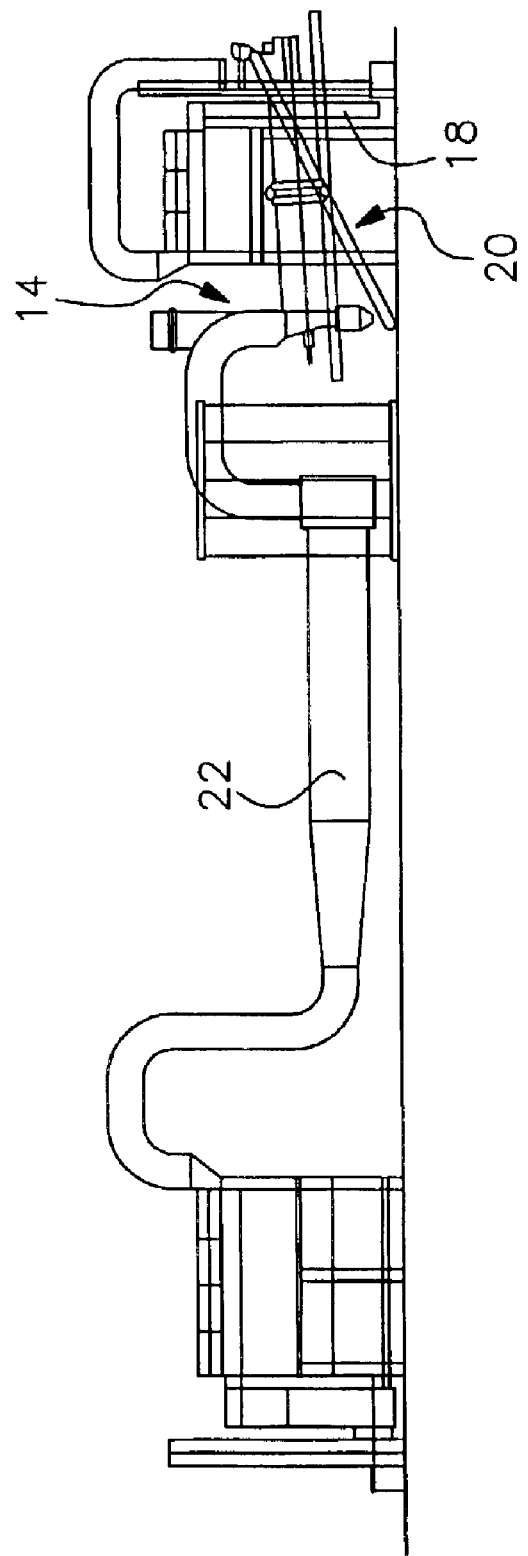
FIG. 3 is a side elevational view of the equipment in FIG. 2.
Figure 4:
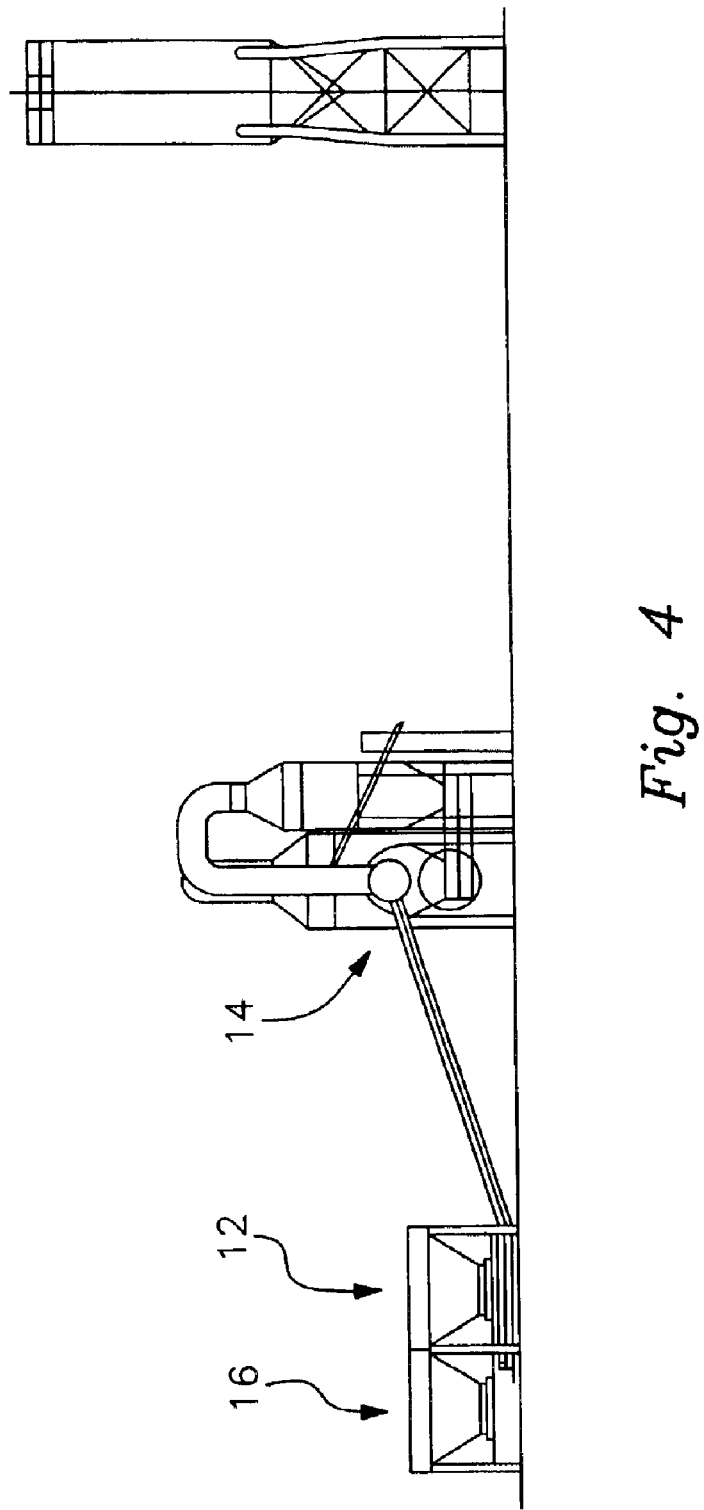
FIG. 4 is a front elevation view of the equipment in FIG. 2.

Ash combustion by-products from a coal fired plant are sized and segmented with a combination of a hydraulic classifier, taught in U.S. Pat. No. 4,961,843 and as shown as block 8 of FIG. 1 of U.S. patent application Ser. No. 09/698,757, and a sieve as shown in block 38 of FIG. 1 of U.S. patent Ser. No. 09/698,757, to control the size and mineral content of the wet fly ash to be processed in accordance with the subject invention. Coal combustion power plants do not achieve complete pulverization resulting in incomplete combustion of carbon which is an impurity for cement replacement or as a mineral filler. Coal combustion power plants take measures, such as reducing the temperature in their boilers to reduce emissions into the atmosphere which, coupled with larger sizes, further elevates the carbon content of the residual ash. The ash discharge from the wet benefication process reports to holding cells, shown as block 38 of FIG. 1 of U.S. patent application Ser. No. 09/698,757, and also as illustrated as block 10 of FIG. 1 of this application, or other known settling devices.

The wet fly ash, with the coarser gradation and larger carbon particles removed, reports to an ash feed system 12 by materials handling equipment, such as trucks, loaders and/or conveyors. The ash is transferred into a mixing chamber 14 by a mechanical feeder at a controlled rate in terms of tons per hour. An aggregate, such as stone, 16 that is significantly coarser than the fly ash material is added to the ash material and mixed. The mass of aggregate is sufficient enough so that it will retain heat for a substantial amount of time. The combined stone and ash report to a drying chamber 18 where heat is applied.

The combined heated stone and ash, with moisture from the ash removed, travel through the drying chamber. Ash, due to its finer particle size, is suspended in a stream of hot air in the drying chamber. The heated stone, which is larger, drops out of the product air stream and is recirculated into the mixing chamber 16 as hot aggregate in closed circuit to aid in removing moisture from the additional wet fly ash which has been transferred to the mixing chamber 14. There, an amount of moisture is removed from this additional wet fly ash prior to exposure to the drying chamber 18.

Hot fly ash with moisture removed travels into the processor chamber 20 where further reduction of mineral impurities, primarily carbon, take place by oxidation. Carbon levels may or may not be prohibitive in this part of the process due to the classification that takes place in the hydraulic classifier and sieve ahead of the system of the subject invention. This part of the process is to assure that the coarse carbon particles are removed. It should be noted that the sizing that is accomplished in the hydraulic classification and sieve procedures is helpful in that technologies that do not address this issue often have difficulty removing large carbon impurities. Large carbon particles sometimes do not combust as readily in the boiler of the power plant and correspondingly are not easily removed without size classification prior to various wet or dry treatment alternatives.

Hot fly ash that is optimized for size, mineral content and moisture reports to a cooling chamber 22 to allow downstream handling. The ash product is transferred to a product load-out 24 staging area to be transferred to trucks or other transportation devices for use by industry.

The process of the subject invention allows for converting of wet ponded fly ash into a dry useful product. Wet classification and sieves are preferably used to prepare the wet ash feed material for drying, particle size control and optimization, and to remove large carbon impurities.

The process of the subject invention uses heated aggregate, and or stone, in closed circuit as a thermal transfer of energy to remove moisture from the ash which is a requirement of the finished product.

The process of the subject invention is completely independent from the operation of the associated coal combustion power plant in terms of product throughput, operating hours, system downtime and seasonal fluctuations balancing the need for electricity and the need for the ash products.

The recirculation from the hot aggregate from drying chamber 18 or processor chamber 20 to the mixing chamber greatly reduces the energy costs of converting wet fly ash into a useful product.

From the foregoing Description of the Preferred Embodiment of the Invention it will be apparent that many modifications may be made therein. It should be understood, however, that this embodiment of the invention is an exemplification of the invention only and the invention is not limited thereto. It is to be understood, therefore, that it is intended in the appended claims to cover all modifications as fall within the true spirit and scope of the invention.

What is claimed is:

1. A process for converting wet fly ash into a useful product comprising the steps of:
   introducing a first amount of wet fly ash;
   introducing an amount of aggregate;
   mixing said aggregate with said wet fly ash thereby forming a first mixture;
   heating said first mixture of wet fly ash and said aggregate, thereby drying said fly ash and heating said aggregate;
   separating the dried fly ash from the heated aggregate;
   introducing a second amount of wet fly ash; and
   mixing said second amount of wet fly ash with said previously heated aggregate whereby said previously heated aggregate assists in drying said second amount of wet fly ash.

2. A process as set forth in claim 1 wherein said aggregate is stone.

3. A process as set forth in claim 1 wherein said aggregate retains heat.

4. A process as set forth in claim 1 wherein the dried fly ash includes a mineral content, further including the step of reducing the mineral content of the dried fly ash.

5. A process as set forth in claim 4 wherein said mineral content is primarily carbon.

6. A process for converting wet fly ash into a useful product comprising the steps of:
   providing a first amount of wet fly ash;
   feeding the wet fly ash into a mixing chamber;
   providing an amount of aggregate;
   feeding said aggregate into said mixing chamber where said wet fly ash is mixed with the aggregate;
   feeding said mixed wet fly ash and said aggregate into a drying chamber;
   heating said aggregate and said wet fly ash in said drying chamber, thereby drying said fly ash and heating said aggregate;
   separating said heated aggregate from said fly ash;
   feeding said heated aggregate into said mixing chamber;
   providing a second amount of wet fly ash; and
   feeding said second amount of wet fly ash into said mixing chamber wherein said second amount of wet fly ash is mixed with said heated aggregate, whereby said heated aggregate assists in drying said second amount of wet fly ash.

7. A process as set forth in claim 6 wherein said aggregate is stone.

8. A process as set forth in claim 6 wherein said aggregate retains heat.

9. A process as set forth in claim 6 further including the step of reducing the mineral content of said dried fly ash.

10. A process as set forth in claim 9 wherein said mineral content is primarily carbon.

* * * * *